United States Patent [19]
Rhodes

[11] 4,449,692
[45] May 22, 1984

[54] DRAIN CONSTRUCTION FOR A RADIATOR

[75] Inventor: Eugene E. Rhodes, Belleville, Mich.

[73] Assignee: Ford Motor Company, Dearborn, Mich.

[21] Appl. No.: 441,337

[22] Filed: Nov. 15, 1982

[51] Int. Cl.³ .................... F16K 51/00; F16K 5/00
[52] U.S. Cl. .................... 251/144; 251/310; 251/287; 165/71
[58] Field of Search ............... 165/171; 251/310, 144, 251/287

[56] References Cited

U.S. PATENT DOCUMENTS

| | | | |
|---|---|---|---|
| 2,612,349 | 9/1952 | Lindera | 165/71 |
| 2,854,027 | 9/1958 | Kaiser et al. | 251/310 |
| 3,540,694 | 11/1970 | Cornelius | 251/310 |
| 3,811,650 | 5/1974 | Dehar | 251/144 |
| 3,910,550 | 10/1975 | Nelson | 251/144 |
| 4,275,868 | 6/1981 | Crone | 251/310 |
| 4,280,498 | 7/1981 | Jensen | 251/310 |

Primary Examiner—A. Michael Chambers
Attorney, Agent, or Firm—William E. Johnson; Olin B. Johnson

[57] ABSTRACT

This invention is directed to a drain construction for a radiator (10) and is built generally as follows. A header (12) includes a drain area (16) which is used to drain fluid from the interior of the header when so desired. The drain area includes a first annular pipe (24) extending into the interior fluid handling portion (20) of the header as well as a larger diameter second annular pipe (30) extending outwardly from the header. The two annular pipes are plugged by a plug (40) which has a lower portion (42) and an upper portion (44). Passageways (56, 58) are provided through the plug in order to facilitate draining of the header. When the plug is rotated to its proper position with the passageways in alignment with a passageway (38) of a third annular pipe (36), fluid may be drained from the radiator. When these passageways are not aligned, fluid is contained within the header.

3 Claims, 4 Drawing Figures

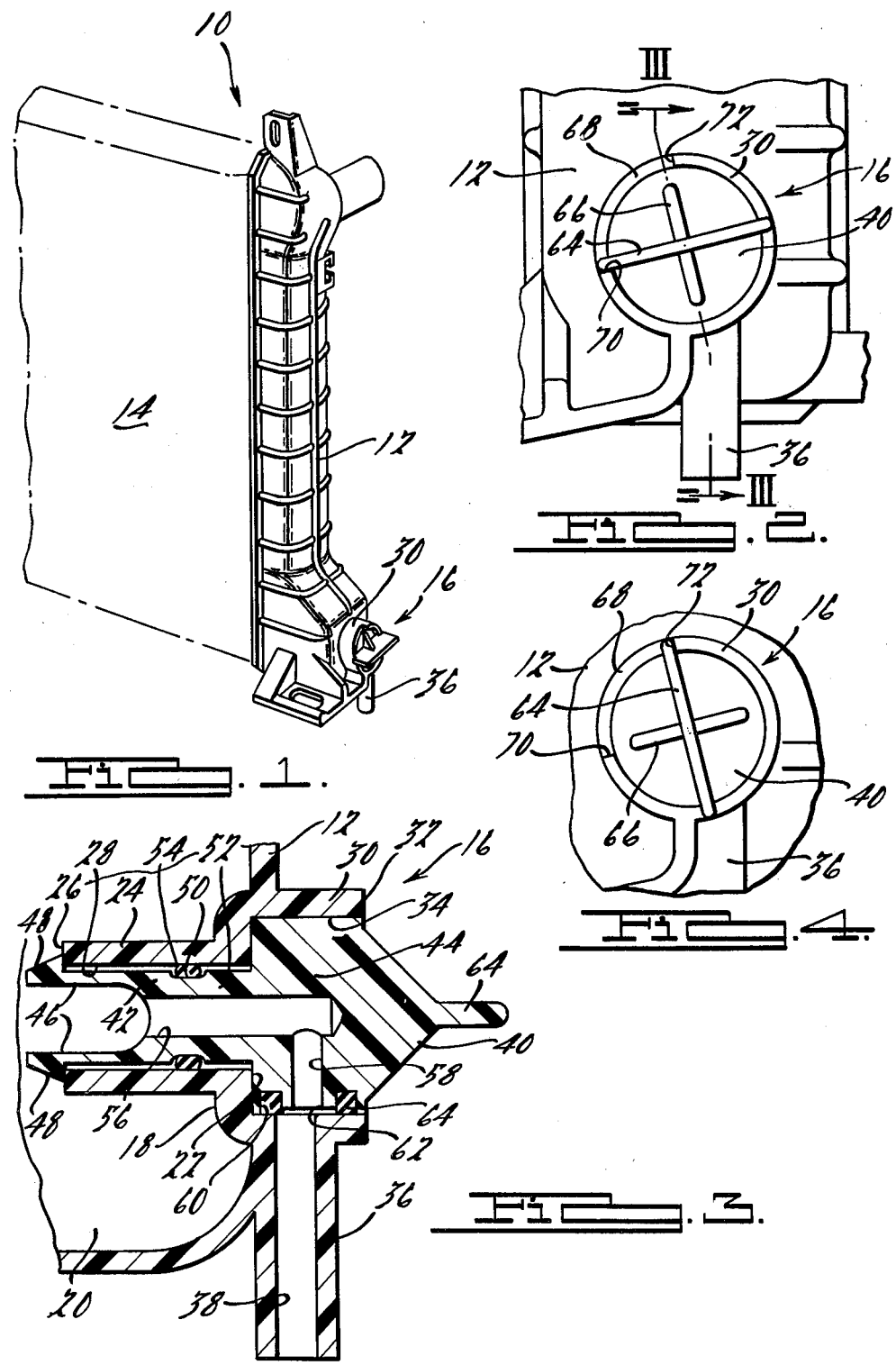

4,449,692

DRAIN CONSTRUCTION FOR A RADIATOR

TECHNICAL FIELD

This invention is directed to a drain construction which finds particular utility as a drain for a radiator. Preferably the radiator is one in which the header thereof is formed of a plastic material and the drain construction is also formed of a plastic material.

BACKGROUND ART AND PRIOR ART STATEMENT

In the recent past, the header portions of automobile radiator structures have been formed from plastic so as to reduce both the weight of the radiator and the cost of manufacture thereof. A method of joining such a plastic header to a radiator structure is shown in my prior application Ser. No. 219,027 filed Dec. 22, 1980, now abandoned.

This invention is directed to a drain construction for use in a header for such a radiator. The drain construction is simple in design and economical to fabricate.

U.S. Pat. No. 2,854,027 is directed to a disposable type three-way valve construction. The valve construction has two relatively interfitting and rotatable parts. These two parts are formed from different synthetic resins, one part being more elastic than the other part thereof to facilitate a snap action assembly thereof.

U.S. Pat. No. 3,540,694 is directed to a valve assembly which includes a number of elements. The elements include a body member having a bore, a valve core member rotatable in the bore with smooth flow passages extending through the valve core. A V-notch is formed in the valve core member which opens into the bore and the passage. A manually detachable handle retains the valve core member in the body member. A molded seal for the valve core member includes a pair of spaced parallel circular portions and a pair of spaced elongated straight parallel connected portions joined at their ends to the circular portions.

DISCLOSURE OF THE INVENTION

This invention is directed to a drain construction and, more particularly, to a drain construction used for a radiator.

In accordance with the teachings of this invention, the drain construction for a radiator includes a header for containing a fluid handled by the radiator. The header includes a drain area having an inner surface facing into an interior fluid handling portion of the header. The header also has an outer surface facing outwardly from the drain area of the header.

A first annular pipe extends from the inner facing surface of the drain area of the header to a free end thereof located within the interior fluid handling portion of the header. The first annular pipe has an interior axially extending opening of a first fixed diameter extending therethrough. The opening in the first annular pipe extends from the outer surface of the drain area of the header to the free end of the first annular pipe.

A second annular pipe extends from the outer surface of the drain area of the header to a free end thereof located above the outer surface of the header. The second annular pipe has an interior axially extending opening of a second fixed diameter extending therethrough from the outer surface of the drain area of the header to the free end of the second annular pipe. The openings of the first annular pipe and the second annular pipe are coaxial with one another. The second fixed diameter of the second annular pipe is larger than the first fixed diameter of the first annular pipe.

A third annular pipe intersects the second annular pipe. The third annular pipe provides a passageway from the opening of the second fixed diameter of the second annular pipe to the exterior of the header.

A plug is provided. This plug is received in part in the opening of the first annular pipe and in part in the opening of the second annular pipe. The plug has a lower portion received in the opening of the first annular pipe, the lower portion having a circular cross section with a diameter slightly smaller than the first fixed diameter of the first annular pipe. The plug also has an upper portion received in the opening of the second annular pipe, this upper portion being of circular cross section with a diameter slightly smaller than the second fixed diameter of the second annular pipe.

The lower portion of the plug has a bifurcated section thereon at its free end. Each of the bifurcations have a locking foot associated therewith. The lower portion of the plug has a length dimension from the upper portion of the plug to the locking feet of the bifurcations thereof slightly greater than the length of the first annular pipe from the outer surface of the header to the free end of the first annular pipe. In this manner the locking feet of the bifurcations are received over the free end of the first annular pipe to hold the plug in place.

A circumferential groove is formed in an unbifurcated section of the lower portion of the plug. An O-ring of resilient material is received in the circumferential groove. This O-ring provides a fluid tight seal between the unbifurcated section of the lower portion of the plug and the first annular pipe.

A passageway is formed through the lower portion and the upper portion of the plug. In this manner the interior fluid handling portion of the header may be interconnected with the third annular pipe when the portion of the passageway located in the upper portion of the plug is aligned with the passageway of the third annular pipe.

A groove is formed about an opening formed by the passageway in the upper portion of the plug. A sealing device is included in the groove for providing a fluid tight seal between the opening formed by the passageway in the upper portion of the plug and the surface of the second fixed diameter of the second annular pipe.

A knob is provided on the plug for turning the plug between open and closed positions. In the open position, the opening formed by the passageway in the upper portion of the plug is aligned with the passageway of the third annular pipe so that fluid may be drained from the header. In the closed position, the aforementioned elements are not aligned and no fluid is drained from the header.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures, and in which:

FIG. 1 is a perspective view of a header attached to a radiator structure, the header having a drain construction therein in accordance with the teachings of this invention;

FIG. 2 is a view of the novel drain construction from the exterior of that construction;

FIG. 3 is a cross section view taken along the line III—III of FIG. 2 showing the details of the drain construction of this invention;

FIG. 4 is a view similar to FIG. 2, but showing a portion of the drain construction moved to an alternate position.

BEST MODE AND INDUSTRIAL APPLICABILITY

The following description is what I consider to be a preferred embodiment of my drain construction for a radiator. The following description also sets forth what I now contemplate to be the best mode of constructing this drain construction. This description is not intended to be a limitation upon the broader principles of this drain construction, and while preferred materials are used to illustrate the construction in accordance with the requirements of the patent laws, it does not mean that the construction should be made with only the stated materials as others may be substituted therefor.

In FIG. 1 there is seen a portion of a radiator generally identified by the numeral 10. The radiator includes a header 12 and a radiator core 14 shown in phantom. The header contains the fluid handled by the radiator and, as well known in the art, the radiator core is used generally to dissipate heat from the fluid as it passes therethrough.

The header 12 includes a drain area generally identified by the numeral 16. The drain area has an inner surface 18 (FIG. 3) which faces into an interior fluid handling portion 20 of the header. The drain area also has an outer surface 22 facing outwardly from the drain area of the header.

A first annular pipe 24 extends from the inner surface 18 of the drain area 16 of the header 12 to a free end 26 thereof within the interior fluid handling portion 20 of the header. The first annular pipe has an interior axially extending opening 28 of a first fixed diameter extending therethrough from the outer surface 22 of the drain area 16 of the header to the free end 26 of the first annular pipe 24.

A second annular pipe 30 extends from the outer surface 22 of the drain area 16 of the header 12 to a free end thereof 32 above the outer surface 22 of the header. The second annular pipe has an interior axially extending opening 34 of a second fixed diameter extending therethrough from the outer surface 22 of the drain area of the header to the free end 32 of the second annular pipe 30. The openings 28 and 34, respectively, of the first annular pipe 24 and the second annular pipe 30, are coaxial with one another as is best seen in FIG. 3. Also, the second fixed diameter of the second annular pipe is larger than the first fixed diameter of the first annular pipe.

A third annular pipe 36 intersects the second annular pipe 30. The third annular pipe provides a passageway 38 from the opening 34 of the second annular pipe to the exterior of the header 12.

A plug 40 is received in part in the opening 28 of the first annular pipe 24 and in part in the opening 34 of the second annular pipe 30. The plug has both a lower portion 42 of circular cross section with a diameter slightly smaller than the first fixed diameter of the first annular pipe 24 and an upper portion 44 of circular cross section with a diameter slightly smaller than the second fixed diameter of the second annular pipe 30.

The lower portion 42 of the plug 40 has a bifurcated section 46 associated therewith. This bifurcated section is located at the free end of the lower portion 42 of the plug 40. Each of the bifurcations have a locking foot 48 associated therewith. The length of the lower portion of the plug from the upper portion 44 of the plug to the locking feet 48—48 is slightly greater than the length of the first annular pipe 24 from the outer surface 22 of the header 12 to the free end 26 of the first annular pipe. In this manner the locking feet 48—48 of the bifurcated section 46 of the lower portion of the plug are received over the free end of the first annular pipe to hold the plug in place as shown in FIG. 3.

As seen best in FIG. 3, a circumferential groove 50 is formed in an unbifurcated section 52 of the lower portion 42 of the plug 40. An O-ring 54 of resilient material is received in the circumferential groove. This O-ring provides a fluid tight seal between the unbifurcated section of the lower portion of the plug and the opening 28 of the first annular pipe 24.

Passageways 56 and 58 are provided through the lower portion 42 and the upper portion 44 of the plug 40. These passageways 56 and 58 can be used to interconnect the interior fluid handling portion 20 of the header 12 and the exterior of the header when the passageways are aligned with the passageway 38 formed in the third annular pipe 36 as is illustrated in FIGS. 2 and 3.

A groove 60 is formed about an opening 62 formed by the passageway 58 in the upper portion 44 of the plug 40. A resilient sealing device is contained in the groove for providing a fluid tight seal between the opening 62 formed by the passageway 58 in the upper portion of the plug and the surface of the opening 34 in the second annular pipe 30.

As best seen in FIGS. 2 and 4, the plug 40 has a long knob member 64 and a short knob member 66. The second annular pipe 30 has a notched out portion 68 which defines stop surfaces 70 and 72 as opposite ends thereof. When the long knob member 64 is rotated to the position shown in FIG. 2, that member 64 is in contact with stop surface 70. When the elements are in this position, as is best illustrated in FIG. 3, the passageways 56 and 58 of the plug 40 are aligned with the passageway 38 in the third annular pipe 36. In this manner the interior fluid handling portion 20 of the header 12 is open to the exterior of the header and any fluid contained in the interior fluid handling portion of the header may be drained therefrom.

When the long knob member 64 is rotated to the position shown in FIG. 4 wherein it is in engagement with stop surface 72 of the notched out portions 68 of the second annular pipe 30, no fluid can be drained from the header. The reason for this is that the passageways 56 and 58 of the plug 40 are not aligned with the passageway 38 of the third annular pipe 36.

The header 12 and plug 40 may be molded from any suitable plastic material which will withstand handling of the fluid which is to pass through the radiator 10 for cooling.

While a particular embodiment of the invention has been illustrated and described, it will be obvious to those skilled in the art that various changes and modifications may be made without departing from the invention, and it is intended to cover in the appended claims all such modifications and equivalents as fall within the true spirit and scope of this invention.

I claim:

1. A drain construction for a radiator which is characterized by:

a header for containing a fluid handled by the radiator, said header including a drain area having an inner surface facing into an interior fluid handling portion of said header and an outer surface facing outwardly from said drain area of said header;

a first annular pipe extending from said inner facing surface of said drain area of said header to a free end thereof within said interior fluid handling portion of said header, said first annular pipe having an interior axially extending opening of a first fixed diameter extending therethrough from said outer surface of said drain area of said header to said free end of said first annular pipe;

a second annular pipe extending from said outer surface of said drain area of said header to a free end thereof above said outer surface of said header, said second annular pipe having an interior axially extending opening of a second fixed diameter extending therethrough from said outer surface of said drain area of said header to said free end of said second annular pipe, said opening of said first annular pipe and said second annular pipe being coaxial with one another with said second fixed diameter of said second annular pipe being larger than said first fixed diameter of said first annular pipe;

a third annular pipe intersecting said second annular pipe and providing a passageway from said opening of said second fixed diameter of said second annular pipe to the exterior of said header;

a plug received in part in said opening of said first annular pipe and in part in said opening of said second annular pipe, said plug having both a lower portion of circular cross section with a diameter slightly smaller than said first fixed diameter of said first annular pipe and an upper portion of circular cross section with a diameter slightly smaller than said second fixed diameter of said second annular pipe;

said lower portion of said plug having a bifurcated section at its free end with each of said bifurcations having a locking foot associated therewith, the length of said lower portion of said plug from said upper portion of said plug to said locking feet of said bifurcations being slightly greater than the length of said first annular pipe from said outer surface of said header to said free end of said first annular pipe whereby said locking feet of said bifurcations are received over said free end of said first annular pipe to hold said plug in place;

a circumferential groove formed in an unbifurcated section of said lower portion of said plug;

an O-ring of resilient material received in said circumferential groove to provide a fluid tight seal between said unbifurcated section of said lower portion of said plug and said first annular pipe;

passageway defining means for forming a passageway through said lower portion and said upper portion of said plug whereby said interior fluid handling portion of said header may be interconnected with said third annular pipe when said portion of said passageway defining means located in said upper portion of said plug is aligned with said passageway of said third annular pipe;

a groove formed about an opening formed by said passageway defining means in said upper portion of said plug;

sealing means in said groove for providing a fluid tight seal between said opening formed by said passageway defining means in said upper portion of said plug and the surface of second fixed diameter of said second annular pipes; and knob means on said upper portion of said plug for turning said plug between an open position in which said opening formed by said passageway defining means in said upper portion of said plug is aligned with said passageway of said third annular pipe and a closed position where said mentioned elements are not aligned.

2. The drain construction of claim 1, wherein said passageway defining means is formed by two intersecting passageways, one passageway extending along the axis of both all of said lower portion and part of said upper portion of said plug and the other passageway extending radially outwardly from the axis of said upper portion of said plug to its outer diameter.

3. The drain construction of claim 1, wherein said knob means includes a long knob member and stop surfaces formed on said free end of said second annular pipe, said long knob member having a portion thereof which contacts a different one of said stop surfaces when said plug is in open position or its closed position.

* * * * *